A. GERMAR.
AUTOMOBILE LIFT.
APPLICATION FILED MAR. 25, 1921.
1,383,800.
Patented July 5, 1921.
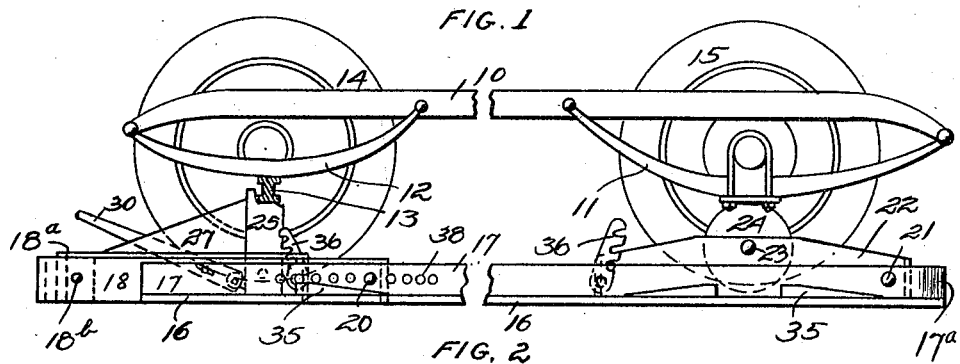
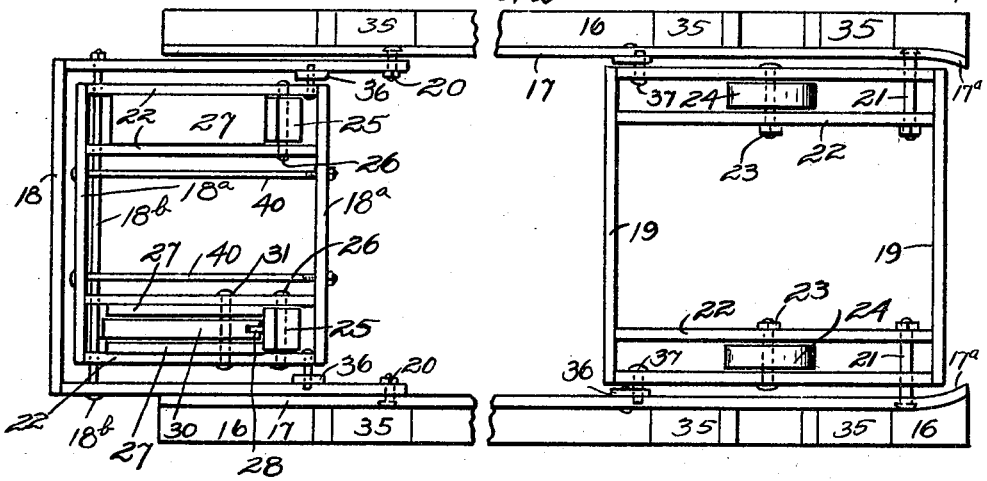
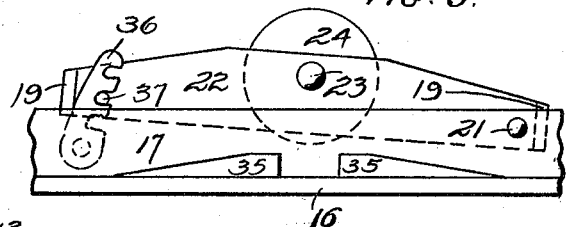
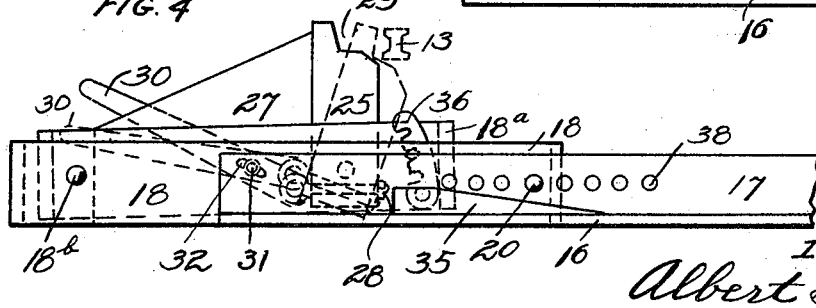
INVENTOR
Albert Germar
BY Pair & Freeman ATTYS.

ABSTRACT# UNITED STATES PATENT OFFICE.

ALBERT GERMAR, OF DES MOINES, IOWA.

AUTOMOBILE-LIFT.

1,383,800. Specification of Letters Patent. Patented July 5, 1921.

Application filed March 25, 1921. Serial No. 455,665.

*To all whom it may concern:*

Be it known that I, ALBERT GERMAR, a citizen of the United States, residing at Des Moines, in the county of Polk and State of Iowa, have invented a certain new and useful Automobile-Lift, of which the following is a specification.

The object of my invention is to provide an automobile lift of simple, durable and inexpensive construction.

More particularly my invention relates to a device which may be used for driving an automobile thereon, the parts being so arranged that when the automobile reaches a certain position it will be raised so that the wheels are off the ground.

Still another object is to provide such a device capable of having the parts adjusted so that automobiles of various wheel bases may be used in connection with my device.

Still another object is to provide means for adjusting the relative height of my device so as to be able to use my device with practically all makes and sizes of automobiles.

With these and other objects in view my invention consists in the construction, arrangement and combination of the various parts of my device whereby the objects contemplated are attained, as hereinafter more fully set forth, pointed out in my claims, and illustrated in the accompanying drawings, in which:

Figure 1 is a side elevation of my device, showing the chassis of an automobile thereon.

Fig. 2 is a top plan view of my device.

Fig. 3 is an enlarged detail, side elevation of the rear supporting frame; and

Fig. 4 is an enlarged, detail, side elevation of the front frame of my device.

In the accompanying drawings I have used the reference numeral 10 to indicate the ordinary frame of an automobile which is provided with a rear spring 11 and a front spring 12.

An axle 13 is fixed to the front spring 12. Wheels 14 and 15 are fixed to the front and rear axles of the automobile.

My device comprises a pair of spaced runways 16 which are provided with sides or guide members 17 on their adjacent edges.

Received between the spaced runways 16 and pivoted to the guide members 17 is a front frame 18 and a rear frame 19.

The guide members 17 are curved as at $17^a$ for making the driving onto the runways easy.

The front frame 18 is pivoted to the guide members 17 by means of the bolts 20. The rear frame 19 is pivoted to the guide members 17 by means of the bolts 21. A frame $18^a$ is pivoted to the frame 18 by means of a bolt $18^b$. The frames $18^a$ and 19 include parallel cross members 22.

Received between the cross members 22 of the frame 19 and rotatably mounted on the bolts 23 are the wheels or drums 24. The wheels or drums 24 are spaced so that when an automobile is driven onto the runway 16 the drums 24 will engage the under surface of the springs 11 of the automobile.

Received between the cross pieces 22 of the front frame $18^a$ and substantially closer to each other than the drums 24 are the arms 25. The front frame $18^a$ is provided with reinforcing rods 40.

The arms 25 are pivoted on the bolts 26. The arms 25 are designed to be engaged by the front axle 13 of the automobile, at the same time as the rear springs are engaged by the drums 24.

The arms 25 are capable of a slight pivotal movement on the bolts 26.

In order to limit the amount of movement of the arms 25, I provide a block 27 placed between the cross pieces 22 and just forwardly of the arms 25. One end of the block 27 is split, the purpose of which will hereafter be set forth.

When it is desired to move the parts to position where they may be operated, the arm 25 is moved on its pivot until it engages the block 27.

As the automobile is driven onto the runways the lowest portion of the front axle will pass between the drums 24, but will be engaged between the arms 25 which are provided with a rabbet 29.

The front axle as soon as it engages the arms 25 will be caused to raise, and at the same time swing the arms 25 until they strike against the blocks 27. This causes the wheel 14 to be raised off of the runways 16. At the same time the drums 24 will be engaged between the springs 11, which causes the rear wheels 15 to be also raised off the runways 16.

In order to release the automobile from the lift device, I provide a foot lever 30 slidably and rotatably mounted on a shaft or bolt 31 and pivotally fixed to a bolt 28 on the arm 25. The lever 30 is provided with a slot 32 which receives the bolt 31 shown in dotted lines in Fig. 4 of the drawings.

When it is desired to release the car from the automobile lift device, the lever 30 is engaged by stepping thereon and moved from the position shown in Fig. 1 of the drawings to the position shown by dotted lines in Fig. 4 of the drawings.

The runways 16 are provided with cleats 35 which are provided with beveled faces, so that when the automobile is about to be lifted the wheels passing over the cleats will cause the automobile to be lifted so as to easily engage the arms 25 and the drums 24.

As soon as the automobile is in engagement with the arms 25 and the drums 24, the wheels are then directly above the open portion between the cleats 35 as shown in Fig. 1 of the drawings in dotted lines.

In order to use my device with automobiles of various heights, I provide notched pivoted sectors 36 which are fixed to the guide members 17 for the rear frame and to the frame 18ª for the front frame 18. The frames 18ª and 19 are provided with pins 37 which engage the notched sector 36.

From the construction of the parts just described, it will be seen that the frames 18ª and 19 may be swung on their pivots and raised to various positions and locked in any of their raised positions by causing the notched sector 36 to engage the pins 37.

The swinging of the frames 18ª and 19 on their pivots will cause the arms 25 and the drums 24 to be raised so that automobiles of various sizes may be used in connection with my device.

In order to take care of automobiles of various wheel bases, I provide a series of openings 38 in the guide members 17. I am then able to shift the frame member 18 longitudinally by moving the bolts 20. The shifting of the frame 18 moves the entire front unit of my device.

By doing this, I am able to vary the distance between the arms 25 and the drums 24.

It will be seen that my device is adjustable so as to take care of automobiles having the springs and axles at various heights and also to take care of automobiles of various wheel bases.

It will further be seen that my device can readily and easily be adjusted, and when once adjusted will be efficient as an automobile lift.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An automobile lift comprising a pair of spaced runways, a pair of frames secured to said runways, arms pivoted to one of said frames, and wheels rotatably mounted on the other of said frames, each of said frames being capable of having one end raised for varying the height of said arms or said wheels, means for engaging said frames for holding them in their raised positions, and means for permitting the frames to be spaced at various distances relative to each other for use with various sizes of automobiles.

2. An automobile lift comprising a pair of spaced runways, a pair of frames secured to said runways, arms pivoted to one of said frames and wheels rotatably mounted on the other of said frames, each of said frames being capable of having one end raised for varying the height of said arms or said wheels, means for engaging said frames for holding them in their raised positions, a lever device for manually controlling one of said arms, and means for permitting the frames to be spaced at various distances relative to each other for use with various sizes of automobiles.

3. An automobile lift including a pair of spaced runways, a frame received therebetween and pivoted to said runways, near their forward ends, a second frame pivoted in said first frame, arms pivoted to said second frame adapted to engage the front axle of an automobile for supporting it, a foot lever device operatively connected to one of said arms for controlling it, a third frame received between said spaced runways and pivoted thereto near their rear ends, a pair of wheels rotatably mounted in said third frame adapted to engage the rear springs of an automobile, means for permitting the moving of said first frame longitudinally relative to said third frame whereby automobiles of various wheel bases may be used with the automobile lift.

4. An automobile lift including a pair of spaced runways, a frame received therebetween and pivoted to said runways near their forward ends, a second frame pivoted in said first frame, arms pivoted to said second frame adapted to engage the front axle of an automobile for supporting it, a foot lever device operatively connected to one of said arms for controlling it, a third frame received between said spaced runways and pivoted thereto near their rear ends, a pair of wheels rotatably mounted in said third frame adapted to engage the rear springs of an automobile, means for permitting the moving of said first frame longitudinally relative to said third frame, whereby automobiles of various wheel bases may be used with the automobile lift, the parts being so arranged that said second and third frames may be swung on their pivots and locked in various positions for varying the height of said arms and said wheels.

5. An automobile lift including a pair of spaced runways, a frame received therebetween and pivoted to said runways near their forward ends, a second frame pivoted in said first frame, arms pivoted to said second frame adapted to engage the front axle of an automobile for supporting it, a lever device operatively connected to one of said arms for controlling it, a third frame received between said spaced runways and pivoted thereto near their rear ends, a pair of wheels rotatably mounted in said third frame adapted to engage the rear springs of an automobile, means for permitting the moving of said first frame longitudinally relative to said third frame, the parts being so arranged that either of said second or third frames may be swung on their pivots for independently varying the position of either the arms or the wheels for the purposes stated.

6. An automobile lift including a pair of spaced runways, a frame received therebetween and pivoted to said runways near their forward ends, a second frame pivoted in said first frame, arms pivoted to said second frame adapted to engage the front axle of an automobile for supporting it, a third frame received between said spaced runways and pivoted thereto near their rear ends, a pair of wheels rotatably mounted in said third frame adapted to engage the rear springs of an automobile, means for permitting the moving of said first frame longitudinally relative to said third frame, whereby automobiles of various wheel bases may be used with the automobile lift, the parts being so arranged that some of said frames may be swung on their pivots and locked in various positions for varying the height of said arms and said wheels.

7. An automobile lift including a pair of spaced runways, a frame received therebetween and pivoted to said runways near their forward ends, a second frame pivoted in said first frame, arms pivoted to said second frame adapted to engage the front axle of an automobile for supporting it, a lever device operatively connected to one of said arms for controlling them, a third frame received between said spaced runways and pivoted thereto near their rear ends, a pair of wheels rotatably mounted in said third frame adapted to engage the rear springs of an automobile, means for permitting the moving of said first frame longitudinally relative to said second frame, some of said frames being capable of being swung on their pivots for varying the height of said arms and said wheels, a pivoted notched sector adapted to engage said frames for locking them in any of their positions.

8. An automobile lift including a pair of spaced runways, a frame received therebetween and pivoted to said runways near their forward ends, a second frame pivoted in said first frame, arms pivoted to said second frame adapted to engage the front axle of an automobile for supporting it, a third frame received between said spaced runways and pivoted thereto near their rear ends, a pair of wheels rotatably mounted in said third frame adapted to engage the rear springs of an automobile, means for permitting the moving of said first and second frames longitudinally relative to said third frame, some of said frames being capable of being swung on their pivots for varying the height of said arms and said wheels, a pivoted notched sector adapted to engage said frames for locking them in any of their positions.

9. An automobile lift including a pair of spaced runways, a frame received therebetween and pivoted to said runways near their forward ends, a second frame pivoted in said first frame, arms pivoted to said second frame adapted to engage the front axle of an automobile for supporting it, a foot lever device operatively connected to said arms for controlling them, a third frame received between said spaced runways and pivoted thereto near their rear ends, a pair of wheels rotatably mounted in said third frame adapted to engage the rear springs of an automobile, means for permitting the moving of said first and second frames longitudinally relative to said third frame, said second and third frames being capable of being swung on their pivots for varying the height of said arms and said wheels, a pivoted notched sector, and means on said frames adapted to coact with said notched sectors for holding said frames in any of their raised positions for the purposes set forth.

Des Moines, Iowa, March 16, 1921.

ALBERT GERMAR.